US012666462B2

(12) United States Patent
Bhamri et al.

(10) Patent No.: US 12,666,462 B2
(45) Date of Patent: Jun. 23, 2026

(54) UE ASSISTANCE FOR NO-LBT BASED UNLICENSED CHANNEL ACCESS

(71) Applicant: Lenovo (Singapore) Pte. Ltd., New Tech Park (SG)

(72) Inventors: Ankit Bhamri, Rödermark (DE); Alexander Golitschek Edler von Elbwart, Darmstadt (DE); Hossein Bagheri, Urbana, IL (US); Karthikeyan Ganesan, Kronberg im Taunus (DE); Ali Ramadan Ali, Kraiburg am Inn (DE); Hyejung Jung, Northbrook, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 312 days.

(21) Appl. No.: 18/293,226

(22) PCT Filed: Jul. 29, 2022

(86) PCT No.: PCT/IB2022/057096
§ 371 (c)(1),
(2) Date: Jan. 29, 2024

(87) PCT Pub. No.: WO2023/007470
PCT Pub. Date: Feb. 2, 2023

(65) Prior Publication Data
US 2025/0081232 A1 Mar. 6, 2025

Related U.S. Application Data

(60) Provisional application No. 63/227,299, filed on Jul. 29, 2021.

(51) Int. Cl.
*H04W 74/0808* (2024.01)
*H04W 24/10* (2009.01)
*H04W 72/044* (2023.01)

(52) U.S. Cl.
CPC ....... *H04W 74/0808* (2013.01); *H04W 24/10* (2013.01); *H04W 72/046* (2013.01)

(58) Field of Classification Search
CPC H04W 74/0808; H04W 24/10; H04W 72/046
See application file for complete search history.

(56) References Cited

U.S. PATENT DOCUMENTS

2018/0352577 A1* 12/2018 Zhang ............... H04W 74/0816
2022/0232588 A1* 7/2022 Chande ............... H04W 72/044

OTHER PUBLICATIONS

PCT/IB2022/057096, "Notification of Transmittal of the International Search Report and the Written Opinion of the International Searching Authority, or the Declaration", International Searching Authority, Dec. 2, 2022, pp. 1-12.
(Continued)

*Primary Examiner* — Wayne H Cai
(74) *Attorney, Agent, or Firm* — Kunzler Needham Hilton

(57) ABSTRACT

Apparatuses, methods, and systems are disclosed for UE assistance for no-LBT based unlicensed channel access. A processor (305) calculates a combined gain from a combination of an antenna configuration gain and a beamforming gain for at least one transmission beam. The processor (305) determines if the at least one transmission beam can be used for a no-LBT based channel access mechanism in an unlicensed band with or without a channel occupancy duration restriction based on the combined gain. The processor (305) transmits, via a transceiver (325), to a network node, information that indicates whether the at least one transmission beam can be used for a no-LBT based channel access mechanism in an unlicensed band with or without a channel occupancy duration restriction, or whether the network node can apply an LBT-based channel access mechanism, or some combination thereof.

15 Claims, 5 Drawing Sheets

(56)     References Cited

OTHER PUBLICATIONS

Nokia et al., "Channel access mechanism", 3GPP TSG RAN WG1 #104-bis-e R1-2102563, Apr. 12-20, 2021, pp. 1-22.

CATT, "Channel access mechanism for up to 71GHz operation", 3GPP TSG RAN WG1 Meeting #104b-e R1-2102626, Apr. 12-20, 2021, pp. 1-9.

Qualcomm Inc., "Feature lead summary of channel access mechanism for 52.6GHZ-71GHz band, ver03", 3GPP TSG RAN WG1 Meeting #105-e R1-2106193, May 10-27, 2021, pp. 1-114.

3GPP, "3rd Generation Partnership Project; Technical Specification Group Radio Access Network; NR; Physical layer procedures for data (Release 16)", 3GPP TS 38.214 V16.6.0, Jun. 2021, pp. 1-172.

3GPP, "3rd Generation Partnership Project; Technical Specification Group Radio Access Network; NR; User Equipment (UE) radio access capabilities (Release 16)", 3GPP TS 38.306 V16.5.0, Jun. 2021, pp. 1-153.

3GPP, "3rd Generation Partnership Project; Technical Specification Group Radio Access Network; NR; Medium Access Control (MAC) protocol specification (Release 16)", 3GPP TS 38.321 V16.5.0, Jun. 2021, pp. 1-157.

* cited by examiner

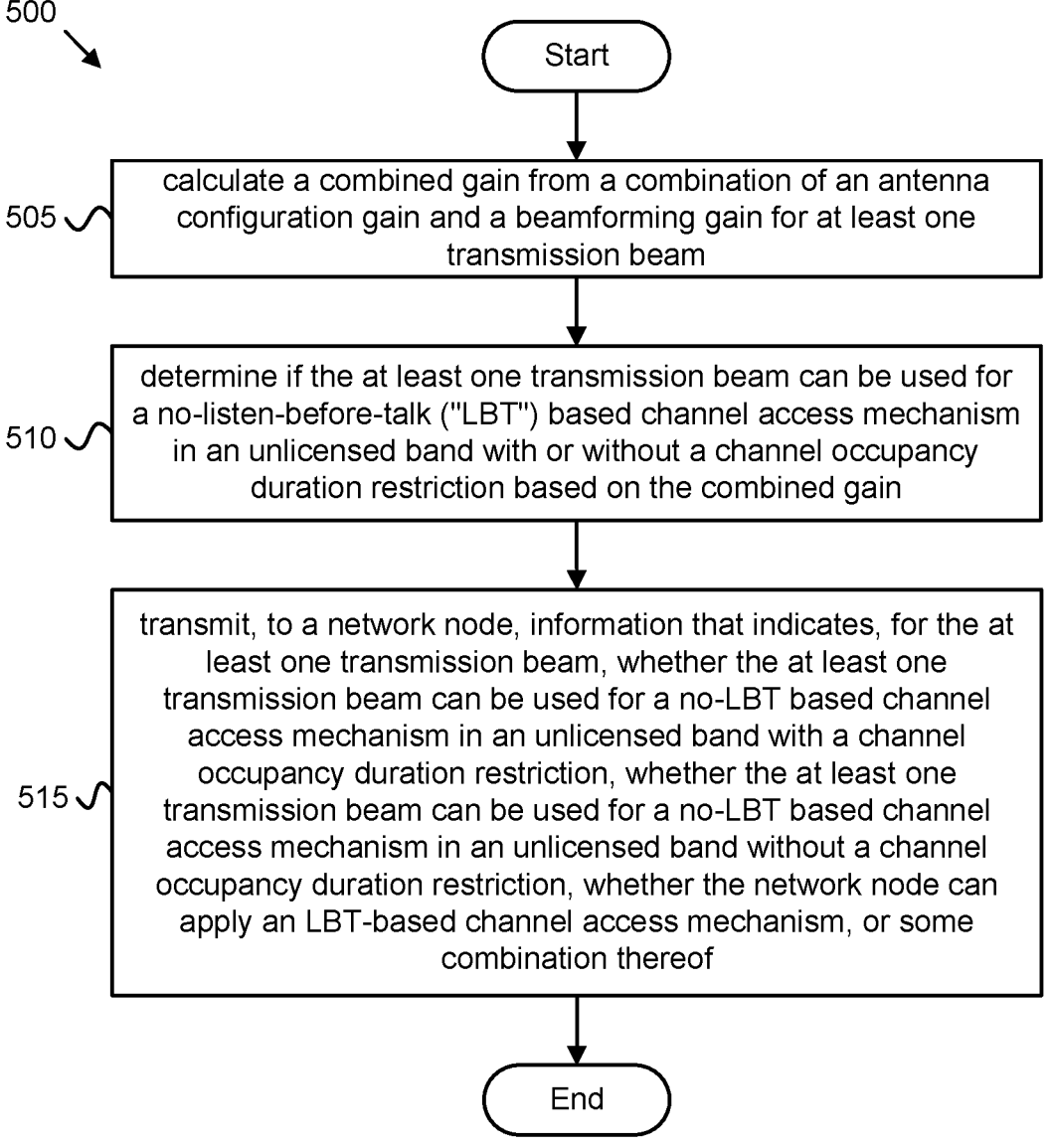

500

Start 505  calculate a combined gain from a combination of an antenna configuration gain and a beamforming gain for at least one transmission beam 510  determine if the at least one transmission beam can be used for a no-listen-before-talk ("LBT") based channel access mechanism in an unlicensed band with or without a channel occupancy duration restriction based on the combined gain 515  transmit, to a network node, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node can apply an LBT-based channel access mechanism, or some combination thereof End

FIG. 5

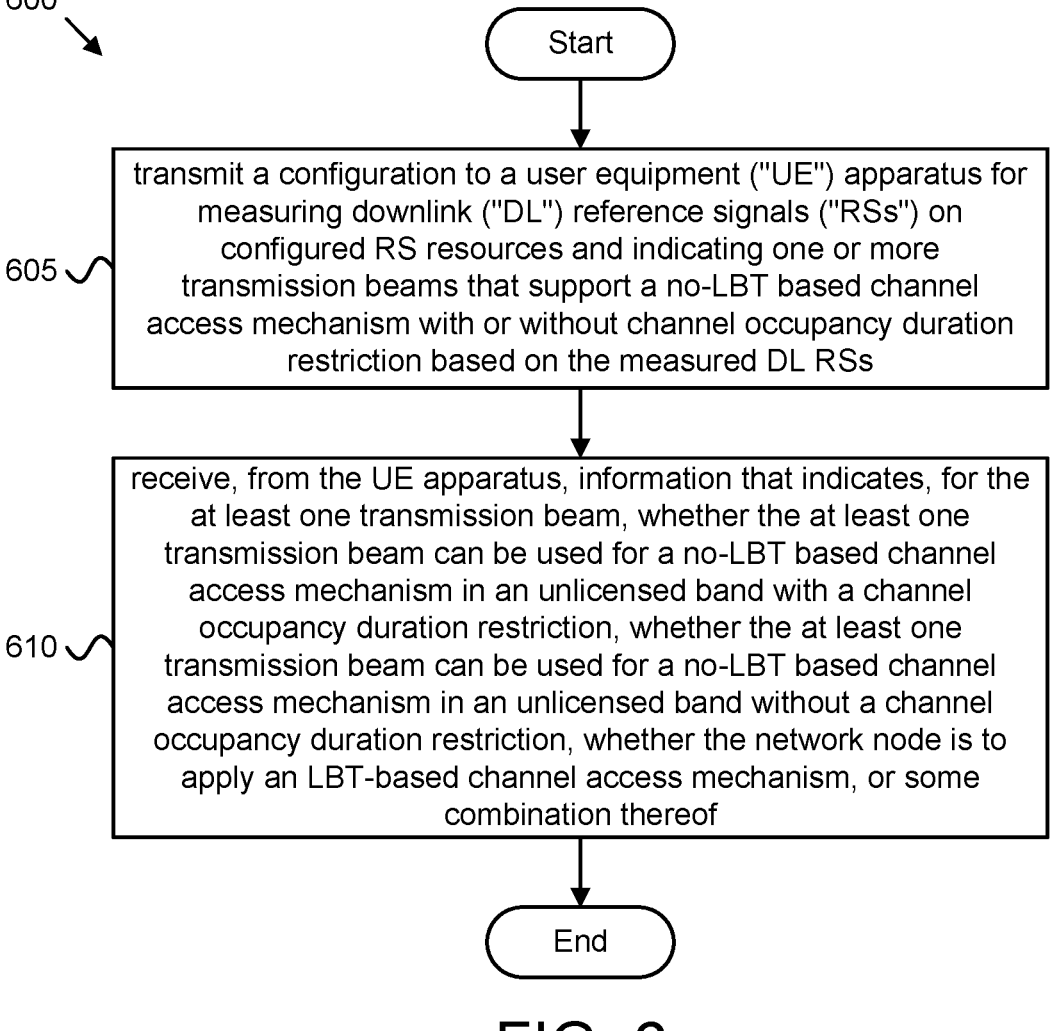

600

Start 605 transmit a configuration to a user equipment ("UE") apparatus for measuring downlink ("DL") reference signals ("RSs") on configured RS resources and indicating one or more transmission beams that support a no-LBT based channel access mechanism with or without channel occupancy duration restriction based on the measured DL RSs 610 receive, from the UE apparatus, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node is to apply an LBT-based channel access mechanism, or some combination thereof End

FIG. 6

UE ASSISTANCE FOR NO-LBT BASED UNLICENSED CHANNEL ACCESS

CROSS REFERENCE TO RELATED APPLICATIONS

This application claims the benefit of U.S. Provisional Patent Application No. 63/227,299, entitled "UE ASSISTANCE FOR NO-LBT BASED UNLICENSED CHANNEL ACCESS" and filed on Jul. 29, 2021, for Ankit Bhamri et al., which is incorporated herein by reference.

FIELD

The subject matter disclosed herein relates generally to wireless communications and more particularly relates to user equipment ("UE") assistance for no-listen before talk ("LBT") based unlicensed channel access.

BACKGROUND

In wireless networks, LBT is a technique whereby a radio transmitter first senses its radio environment before it starts a transmission. LBT can be used by a radio device to find a network that the device is allowed to operate on or to find a free radio channel to operate on. A device may perform no-LBT based channel access mechanism if the combined maximum gain from antenna configuration and beamforming is above a minimum required threshold value.

BRIEF SUMMARY

Disclosed are solutions for UE assistance for no-LBT based unlicensed channel access. The solutions may be implemented by apparatus, systems, methods, or computer program products.

In one embodiment, a first apparatus includes a transceiver and a processor coupled to the transceiver. In one embodiment, the processor is configured to cause the apparatus to calculate a combined gain from a combination of an antenna configuration gain and a beamforming gain for at least one transmission beam. In one embodiment, the processor is configured to cause the apparatus to determine if the at least one transmission beam can be used for a no-LBT based channel access mechanism in an unlicensed band with or without a channel occupancy duration restriction based on the combined gain. In one embodiment, the processor is configured to cause the apparatus to transmit, to a network node, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node can apply an LBT-based channel access mechanism, or some combination thereof.

In one embodiment, a first method for a UE apparatus calculates a combined gain from a combination of an antenna configuration gain and a beamforming gain for at least one transmission beam. In one embodiment, the first method determines if the at least one transmission beam can be used for a no-LBT based channel access mechanism in an unlicensed band with or without a channel occupancy duration restriction based on the combined gain. In one embodiment, the first method transmits, to a network node, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node can apply an LBT-based channel access mechanism, or some combination thereof.

In one embodiment, a second apparatus includes a transceiver and a processor coupled to the transceiver. In one embodiment, the processor is configured to cause the apparatus to transmit a configuration to a UE apparatus for measuring DL RSs on configured RS resources and indicating one or more transmission beams that support a no-LBT based channel access mechanism with or without channel occupancy duration restriction based on the measured DL RSs. In one embodiment, the processor is configured to cause the apparatus to receive, from the UE apparatus, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node is to apply an LBT-based channel access mechanism, or some combination thereof.

In one embodiment, a second method transmits a configuration to a UE apparatus for measuring DL RSs on configured RS resources and indicating one or more transmission beams that support a no-LBT based channel access mechanism with or without channel occupancy duration restriction based on the measured DL RSs. In one embodiment, the second method receives, from the UE apparatus, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node is to apply an LBT-based channel access mechanism, or some combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

3

Figure 1:
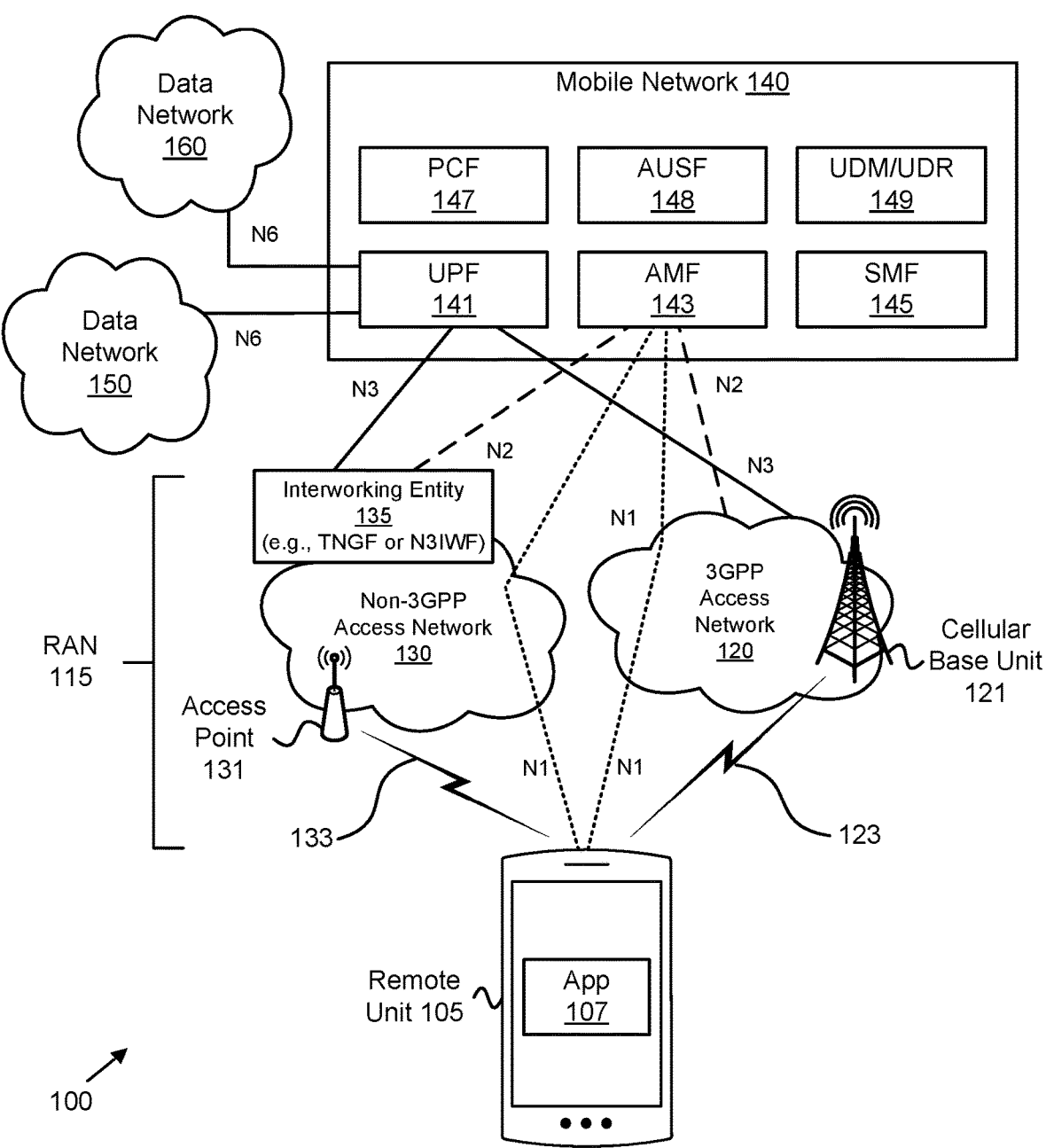
FIG. 1 is a schematic block diagram illustrating one embodiment of a wireless communication system for UE assistance for no-LBT based unlicensed channel access.

FIG. 5 is a flowchart diagram illustrating one embodiment of a method for UE assistance for no-LBT based unlicensed channel access; and FIG. 6 is a flowchart diagram illustrating one embodiment of another method for UE assistance for no-LBT based unlicensed channel access.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for UE assistance for no-LBT based unlicensed channel access. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

In wireless networks, LBT is a technique whereby a radio transmitter first senses its radio environment before it starts a transmission. LBT can be used by a radio device to find a network that the device is allowed to operate on or to find a free radio channel to operate on. A device may perform no-LBT based channel access mechanism if the combined maximum gain from antenna configuration and beamforming is above a minimum required threshold value. As a result, for network to configure the UE with no-LBT mode, it would require some assistance information from the UE. Furthermore, since the network is also indicating the beams for UL transmission via sounding reference signal ("SRS") resource indicator ("SRI") and/or transmission configuration indicator ("TCI") indication, therefore, the network should also be aware if the indicated beams can be used by UE along with no-LBT mode.

In Rel-17 new radio ("NR"), channel access mechanisms for unlicensed access in the 60 GHz band is specified. In contrast to only LBT based channel access mechanism in FR1, it has been agreed to support both LBT and no-LBT based channel access mechanism for the 60 GHz band. In regions where LBT is mandated, either mode of operation can be supported and configured by the network. Currently, it has been agreed to support both cell-specific and UE-specific configuration to signal whether to apply LBT or no-LBT based channel access mechanism. However, it is not specified when either of the two mechanisms could be configured by the network.

Recently, in ETSI BRAN (ETSI EN 303 753 V0.0.4), some conditions on when the no-LBT mode can be applied by a device has been agreed. Basically, a device can perform no-LBT based channel access mechanism if the combined maximum gain from antenna configuration and beamforming is above a minimum required threshold value. As a result, for a network to configure the UE with no-LBT mode, it would require some assistance information from the UE. Furthermore, since the network is also indicating the beams for uplink ("UL") transmission via SRI and/or TCI indication, the network should also be aware if the indicated beams can be used by UE along with no-LBT mode. In this disclosure, solutions to handle the following issues are presented:

How to support some form of UE assistance to the network to optimally make the decision of configuring LBT or no-LBT mode at the UE for unlicensed channel access?

How to support the network to configure the appropriate set of beams for allowing no-LBT mode at the UE?

How to handle the channel access mechanism at the responding device depending up on the combined maximum gain for the antenna assembly and beamforming?

FIG. 1 depicts a wireless communication system 100 for UE assistance for no-LBT based unlicensed channel access, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example World-wide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like.

Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via UL and downlink ("DL") communication signals. Furthermore, the UL and DL communication signals may be carried over the 3GPP communication links 123. Similarly, the remote units 105 may communicate with one or more access points 131 in the non-3GPP access network (s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VoIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (e.g., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5GRAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

In the following descriptions, the term "gNB" is used for the base station but it is replaceable by any other radio access node, e.g., RAN node, eNB, Base Station ("BS"), Access Point ("AP"), NR, etc. Further the operations are described mainly in the context of 5G NR. However, the proposed solutions/methods are also equally applicable to other mobile communication systems supporting CSI enhancements for higher frequencies.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, for channel access in NR Rel-17, for regions where LBT is not mandated, the gNB should indicate to the UE that the gNB-UE connection is operating in LBT mode or no-LBT mode. Down-select is performed between (1) support for cell specific (common for all UEs in a cell as part of system information or dedicated radio resource control ("RRC") signaling or both) gNB indication and (2) support for both cell specific (common for all UEs in a cell as part of system information or dedicated RRC signaling or both) and UE specific (can be different for different UEs in a cell as part of UE-specific RRC configuration) gNB indication.

For regions where LBT is not mandated, the gNB should indicate to the UE that the gNB-UE connection is operating in LBT mode or no-LBT mode. In such an embodiment, support for both cell specific (common for all UEs in a cell as part of system information or dedicated RRC signaling or both) and UE specific (can be different for different UEs in a cell as part of UE-specific RRC configuration) gNB indication is provided.

According to the clause 4.2.6 in ETSI EN 303 753 V0.0.4, the following details related to beamforming requirements for no-LBT based channel access mechanism are described.

Spectrum sharing mechanisms are intended to facilitate sharing between the various technologies and applications in the frequency band. The equipment within the scope of the present document shall fulfill one or a combination of the spectrum sharing mechanisms defined below.

In the following, a device that initiates a sequence of one or more transmissions is denoted as the Initiating Device. Otherwise, the device is denoted as a Responding Device. Equipment may be an Initiating Device, a Responding Device, or both.

As used herein, beamforming reduces the interference caused to other devices and facilitates spectrum sharing by directing the radiated energy towards the intended spatial direction.

An Initiating Device shall have the combined maximum gain for the antenna assembly G and beamforming Y of at least [x1] dBi. A Responding Device shall have the combined maximum gain for the antenna assembly G and beamforming Y of at least [x2] dBi. The total duration of the Responding Device's transmissions shall be less than [t1] μs within an observation period of [t2] ms. If a Responding Device is capable of combined gain for the antenna assembly G and beamforming Y of at least [x1] dBi, then it is not constrained by the duration limit.

In current NR, a quasi co-location ("QCL")/TCI framework is specified to indicate the beams to the UE for receiving DL transmissions from the gNB. Furthermore, in Rel-17, the framework is extended to indicate the beams for transmitting UL from the UE. In this indication, mainly the measurements are used to determine the suitable beams for UE transmission/reception. For channel access, there is no further consideration if the beams can be applicable for no-LBT mode or not.

Regarding antenna ports QCL, the UE can be configured with a list of up to M TCI-State configurations within the higher layer parameter PDSCH-Config to decode physical downlink shared channel ("PDSCH") according to a detected physical downlink control channel ("PDCCH") with downlink control information ("DCI") intended for the UE and the given serving cell, where M depends on the UE capability maxNumberConfiguredTCIstatesPerCC. Each TCI-State contains parameters for configuring a quasi-co-location relationship between one or two downlink reference signals and the demodulation reference signal ("DM-RS") ports of the PDSCH, the DM-RS port of PDCCH or the channel state information reference signal ("CSI-RS") port (s) of a CSI-RS resource. The quasi co-location relationship is configured by the higher layer parameter qcl-Type1 for the first DL RS, and qcl-Type2 for the second DL RS (if configured). For the case of two DL RSs, the QCL types shall not be the same, regardless of whether the references are to the same DL RS or different DL RSs. The quasi co-location types corresponding to each DL RS are given by the higher layer parameter qcl-Type in QCL-Info and may take one of the following values:

'typeA': {Doppler shift, Doppler spread, average delay, delay spread}

'typeB': {Doppler shift, Doppler spread}

'typeC': {Doppler shift, average delay}

'typeD': {Spatial Rx parameter}

The UE receives an activation command, e.g., as described in clause 6.1.3.14 of TS 38.321, used to map up to 8 TCI states to the codepoints of the DCI field 'Transmission Configuration Indication' in one component carrier ("CC")/ DL bandwidth part ("BWP") or in a set of CCs/DL BWPs, respectively. When a set of TCI state IDs are activated for a set of CCs/DL BWPs, where the applicable list of CCs is determined by indicated CC in the activation command, the same set of TCI state IDs are applied for all DL BWPs in the indicated CCs.

When a UE supports two TCI states in a codepoint of the DCI field 'Transmission Configuration Indication' the UE may receive an activation command, e.g., as described in clause 6.1.3.24 of TS 38.321, the activation command is used to map up to 8 combinations of one or two TCI states to the codepoints of the DCI field 'Transmission Configuration Indication'. The UE is not expected to receive more than 8 TCI states in the activation command.

When the DCI field 'Transmission Configuration Indication' is present in DCI format 1_2 and when the number of codepoints S in the DCI field 'Transmission Configuration Indication' of DCI format 1_2 is smaller than the number of TCI codepoints that are activated by the activation command, e.g., as described in clause 6.1.3.14 and 6.1.3.24 of TS38.321, only the first S activated codepoints are applied for DCI format 1_2.

When the UE would transmit a physical uplink control channel ("PUCCH") with hybrid automatic repeat request acknowledgement ("HARQ-ACK") information in slot n corresponding to the PDSCH carrying the activation command, the indicated mapping between TCI states and codepoints of the DCI field 'Transmission Configuration Indication' should be applied starting from the first slot that is after slot $$n + 3N_{slot}^{subframe,\mu}$$

where μ is the subcarrier spacing ("SCS") configuration for the PUCCH. If tci-PresentInDCI is set to 'enabled' or tci-PresentDCI-1-2 is configured for the control resource set ("CORESET") scheduling the PDSCH, and the time offset between the reception of the DL DCI and the corresponding PDSCH is equal to or greater than timeDurationForQCL if applicable, after a UE receives an initial higher layer configuration of TCI states and before reception of the activation command, the UE may assume that the DM-RS ports of PDSCH of a serving cell are quasi co-located with the synchronization signal ("SS")/physical broadcast channel ("PBCH") block determined in the initial access procedure with respect to qcl-Type set to 'typeA', and when applicable, also with respect to qcl-Type set to 'typeD'.

If a UE is configured with the higher layer parameter tci-PresentInDCI that is set as 'enabled' for the CORESET scheduling the PDSCH, the UE assumes that the TCI field is present in the DCI format 1_1 of the PDCCH transmitted on the CORESET. If a UE is configured with the higher layer parameter tci-PresentDCI-1-2 for the CORESET scheduling the PDSCH, the UE assumes that the TCI field with a DCI field size indicated by tci-PresentDCI-1-2 is present in the DCI format 1_2 of the PDCCH transmitted on the CORE-SET. If the PDSCH is scheduled by a DCI format not having the TCI field present, and the time offset between the reception of the DL DCI and the corresponding PDSCH of a serving cell is equal to or greater than a threshold time-DurationForQCL if applicable, where the threshold is based on reported UE capability, e.g., as in TS 38.306, for determining PDSCH antenna port quasi co-location, the UE assumes that the TCI state or the QCL assumption for the PDSCH is identical to the TCI state or QCL assumption whichever is applied for the CORESET used for the PDCCH transmission within the active BWP of the serving cell.

If the PDSCH is scheduled by a DCI format having the TCI field present, the TCI field in DCI in the scheduling component carrier points to the activated TCI states in the scheduled component carrier or DL BWP, the UE shall use the TCI-State according to the value of the 'Transmission Configuration Indication' field in the detected PDCCH with DCI for determining PDSCH antenna port quasi co-location. The UE may assume that the DM-RS ports of PDSCH of a serving cell are quasi co-located with the RS(s) in the TCI state with respect to the QCL type parameter(s) given by the indicated TCI state if the time offset between the reception of the DL DCI and the corresponding PDSCH is equal to or greater than a threshold timeDurationForQCL, where the threshold is based on reported UE capability, e.g., as in TS 38.306. When the UE is configured with a single slot PDSCH, the indicated TCI state should be based on the activated TCI states in the slot with the scheduled PDSCH. When the UE is configured with a multi-slot PDSCH, the indicated TCI state should be based on the activated TCI states in the first slot with the scheduled PDSCH, and UE shall expect the activated TCI states are the same across the slots with the scheduled PDSCH. When the UE is configured with CORESET associated with a search space set for cross-carrier scheduling and the UE is not configured with enableDefaultBeamForCCS, the UE expects tci-PresentIn-DCI is set as 'enabled' or tci-PresentDCI-1-2 is configured for the CORESET, and if one or more of the TCI states configured for the serving cell scheduled by the search space set contains qcl-Type set to 'typeD', the UE expects the time offset between the reception of the detected PDCCH in the search space set and the corresponding PDSCH is larger than or equal to the threshold timeDurationForQCL.

Independent of the configuration of tci-PresentInDCI and tci-PresentDCI-1-2 in RRC connected mode, if the offset between the reception of the DL DCI and the corresponding PDSCH is less than the threshold timeDurationForQCL and at least one configured TCI state for the serving cell of scheduled PDSCH contains qcl-Type set to 'typeD', the UE may assume that the DM-RS ports of PDSCH of a serving cell are quasi co-located with the RS(s) with respect to the QCL parameter(s) used for PDCCH quasi co-location indication of the CORESET associated with a monitored search space with the lowest control-ResourceSetId in the latest slot in which one or more CORESETs within the active BWP of the serving cell are monitored by the UE. In this case, if the qcl-Type is set to 'typeD' of the PDSCH DM-RS is different from that of the PDCCH DM-RS with which they overlap in at least one symbol, the UE is expected to prioritize the reception of PDCCH associated with that CORESET. This also applies to the intra-band carrier aggregation ("CA") case (when PDSCH and the CORESET are in different component carriers).

If a UE is configured with enableDefaultTCIStatePer-CoresetPoolIndex and the UE is configured by higher layer parameter PDCCH-Config that contains two different values of coresetPoolIndex in different Control-ResourceSets, the UE may assume that the DM-RS ports of PDSCH associated with a value of coresetPoolIndex of a serving cell are quasi co-located with the RS(s) with respect to the QCL parameter(s) used for PDCCH quasi co-location indication of the CORESET associated with a monitored search space with the lowest controlResourceSetId among CORESETs, which are configured with the same value of coresetPoolIndex as the PDCCH scheduling that PDSCH, in the latest slot in which one or more CORESETs associated with the same value of coresetPoolIndex as the PDCCH scheduling that PDSCH within the active BWP of the serving cell are monitored by the UE. In this case, if the 'QCL-TypeD' of the PDSCH DM-RS is different from that of the PDCCH DM-RS with which they overlap in at least one symbol and they are associated with same coresetPoolIndex, the UE is expected to prioritize the reception of PDCCH associated with that CORESET. This also applies to the intra-band CA case (when PDSCH and the CORE-SET are in different component carriers).

If a UE is configured with enableTwoDefaultTCI-States, and at least one TCI codepoint indicates two TCI states, the UE may assume that the DM-RS ports of PDSCH or PDSCH transmission occasions of a serving cell are quasi co-located with the RS(s) with respect to the QCL parameter(s) associated with the TCI states corresponding to the lowest codepoint among the TCI codepoints containing two different TCI states. When the UE is configured by higher layer parameter repetitionScheme set to 'tdmSchemeA' or is configured with higher layer parameter repetitionNumber, the mapping of the TCI states to PDSCH transmission occasions is determined, e.g., according to clause 5.1.2.1, by replacing the indicated TCI states with the TCI states corresponding to the lowest codepoint among the TCI codepoints containing two different TCI states based on the activated TCI states in the slot with the first PDSCH transmission occasion. In this case, if the 'QCL-TypeD' in both of the TCI states corresponding to the lowest codepoint among the TCI codepoints containing two different TCI states is different from that of the PDCCH DM-RS with which they overlap in at least one symbol, the UE is expected to prioritize the reception of PDCCH associated with that CORESET. This also applies to the intra-band CA case (when PDSCH and the CORESET are in different component carriers)

In the cases above, if none of configured TCI states for the serving cell of scheduled PDSCH is configured with qcl-Type set to 'typeD', the UE shall obtain the other QCL assumptions from the indicated TCI states for its scheduled PDSCH irrespective of the time offset between the reception of the DL DCI and the corresponding PDSCH.

If the PDCCH carrying the scheduling DCI is received on one CC, and the PDSCH scheduled by that DCI is on another CC and the UE is configured with enableDefaultBeamForCCS:

The timeDurationForQCL is determined based on the subcarrier spacing of the scheduled PDSCH. If $\mu_{PDCCH} < \mu_{PDSCH}$ an additional timing delay $$d\frac{2^{\mu}PDSCH}{2^{\mu}PDCCH}$$

is added to the timeDurationForQCL, where, e.g., d is defined as in 5.2.1.5.1a-1, otherwise d is zero;

For both the cases where the offset between the reception of the DL DCI and the corresponding PDSCH is less than the threshold timeDurationForQCL, and wehre the DL DCI does not have the TCI field present, the UE obtains its QCL assumption for the scheduled PDSCH from the activated TCI state with the lowest ID applicable to PDSCH in the active BWP of the scheduled cell.

For a periodic CSI-RS resource in a non-zero power ("NZP")-CSI-RS-ResourceSet configured with higher layer parameter trs-Info, the UE shall expect that a TCI-State indicates one of the following quasi co-location type(s):

'typeC' with an SS/PBCH block and, when applicable, 'typeD' with the same SS/PBCH block, or 'typeC' with an SS/PBCH block and, when applicable, 'typeD' with a CSI-RS resource in an NZP-CSI-RS-ResourceSet configured with higher layer parameter repetition, or For an aperiodic CSI-RS resource in an NZP-CSI-RS-ResourceSet configured with higher layer parameter trs-Info, the UE shall expect that a TCI-State indicates qcl-Type set to 'typeA' with a periodic CSI-RS resource in a NZP-CSI-RS-ResourceSet configured with higher layer parameter trs-Info and, when applicable, qcl-Type set to 'typeD' with the same periodic CSI-RS resource.

For a CSI-RS resource in an NZP-CSI-RS-ResourceSet configured without higher layer parameter trs-Info and without the higher layer parameter repetition, the UE shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs-Info and, when applicable, 'typeD' with an SS/PBCH block, or 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, or 'typeB' with a CSI-RS resource in a NZP-CSI-RS-ResourceSet configured with higher layer parameter trs-Info when 'typeD' is not applicable.

For a CSI-RS resource in an NZP-CSI-RS-ResourceSet configured with higher layer parameter repetition, the UE shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs-Info and, when applicable, 'typeD' with a CSI-RS resource in a NZP-CSI-RS-ResourceSet configured with higher layer parameter repetition, or 'typeC' with an SS/PBCH block and, when applicable, 'typeD' with the same SS/PBCH block.

For the DM-RS of PDCCH, the UE shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition, or 'typeA' with a CSI-RS resource in a NZP-CSI-RS-ResourceSet configured without higher layer parameter trs-Info and without higher layer parameter repetition and, when applicable, 'typeD' with the same CSI-RS resource.

For the DM-RS of PDSCH, the UE shall expect that a TCI-State indicates one of the following quasi co-location type(s):

'typeA' with a CSI-RS resource in a NZP-CSI-RS-ResourceSet configured with higher layer parameter trs-Info and, when applicable, 'typeD' with the same CSI-RS resource, or 'typeA' with a CSI-RS resource in a NZP-CSI-RS-ResourceSet configured with higher layer parameter trs-Info and, when applicable, 'typeD' with a CSI-RS resource in an NZP-CSI-RS-ResourceSet configured with higher layer parameter repetition, or typeA' with a CSI-RS resource in a NZP-CSI-RS-ResourceSet configured without higher layer parameter trs-Info and without higher layer parameter repetition and, when applicable, 'typeD' with the same CSI-RS resource.

In a first embodiment directed to UE assistance information or reporting for no-LBT operation at UE, a UL transmission ("Tx") beam is reported by the UE in terms of its capability to support no-LBT channel access mechanism in unlicensed bands. UE reporting corresponding to beam measurements is enhanced to indicate if the measured RS beam satisfies the criteria for operating in no-LBT mode without any restriction in terms of channel occupancy duration in unlicensed bands and/or operating in no-LBT mode with restriction in terms of channel occupancy duration in unlicensed bands.

In one implementation, the UE is configured by the network to measure DL RS (such as CSI-RS, PDCCH DM-RS, SSB, and/or the like) on the configured RS resources and indicate at least which of reported beams can be used to support the no-LBT mode at the UE for UL transmission (when beam correspondence is possible), and it may report any restrictions or limitations regarding the usage of no-LBT mode.

For example, if the UE is configured to measure 8 CSI-RS resources corresponding to 8 beams, then the UE is configured to report back the 4 best beams, the corresponding RSRP measurements of the 4 best beams, and indicate for each of the 4 best beams whether they can be applied for no-LBT, at least with the corresponding antenna and beamforming gain of UL Tx, without channel occupancy duration restriction, or with a maximum transmission duration limitation if it acts e.g., as a responding device or a device not initiating a channel occupancy, or for no-LBT with channel occupancy duration restriction or cannot be applied with no-LBT at all. This would allow the network to configure the right set of beams for UL transmission for operating in no-LBT mode operation.

In an alternate implementation, the UE is configured by the network to measure DL RS (such as CSI-RS, PDCCH DM-RS, SSB, etc.) on the configured RS resources and indicate only the beams that can be used to support the no-LBT mode at the UE for UL transmission (when beam correspondence is possible). For example, if the UE is configured to measure 8 CSI-RS resources corresponding to 8 beams, then the UE is configured to report back at least one beam that can be applied for no-LBT without channel occupancy duration restriction, or with a maximum transmission duration limitation if it acts e.g. as a responding device or a device not initiating a channel occupancy, and/or for no-LBT with channel occupancy duration restriction. In addition, other quantities such as reference signal received power ("RSRP"), channel quality indicator ("CQI"), precoding matrix indicator ("PMI"), and/or the like, could also be reported for the indicated beams.

In an example, if the UE cannot find a beam that can be applied for no-LBT without channel occupancy duration restriction and/or for no-LBT with channel occupancy duration restriction, the UE informs the network that no suitable beam is found.

In another example, the channel occupancy duration with no-LBT is determined based on DL RS measurements and/or DL RS measurement statistics. The UE indicates the channel occupancy duration to the gNB, e.g., when the UE initiates a channel occupancy time ("COT"), the UE indicates e.g., in configured grant ("CG")-uplink control information ("UCI"), the channel occupancy duration with no-LBT.

In another example, an initiating device transmitting based on no-LBT mode without channel occupancy duration restriction, indicates an amount (or a maximum amount) that the responding device can share the channel occupancy. The indication (potentially with different contents each time) can be sent several times within the channel occupancy (e.g., with each transmission), and the same starting point for sharing the channel occupancy is indicated. The UE should provide consistent COT sharing information in all the subsequent CG PUSCHs, if any, occurring within the same UE's initiated COT such that the same DL starting point and duration are maintained.

In another implementation, the UE is configured by the network to transmit UL RS, such as SRS, for transmission on the configured RS resources to allow the network to measure UL RS for determining a set of beams to apply for UL transmission. In such an embodiment, the network can additionally configure the UE to transmit UL on the beams corresponding to only the RS beams that can satisfy the requirements for no-LBT mode without any restriction in terms of channel occupancy duration in unlicensed bands and/or operating in no-LBT mode with restriction in terms of channel occupancy duration in unlicensed bands. Therefore, if the UE determines that the configured RS resource beam cannot satisfy the requirements, then it will not transmit those RS beams. This may allow the network to receive beams with sufficient RSRP and those beams that can later be configured for UL transmission with no-LBT mode. Alternatively, in one embodiment, the UL RS received by the network can be used as a source RS for QCL assumption for UL transmission such as PUSCH and/or PUCCH.

In another alternate implementation, the network can configure the UE to transmit the RS beams, and additionally provide assistance information to the network about which of the configured RS beams can satisfy the requirements for no-LBT mode without any restriction in terms of channel occupancy duration in unlicensed bands and/or operating in no-LBT mode with restriction in terms of channel occupancy duration in unlicensed bands. In such an embodiment, additional UL signaling (for example, via PUCCH or multiplexing with other data in PUSCH) may be used.

In a second embodiment directed to a QCL/TCI framework extension for no-LBT operation at UE, TCI indication can be used to either explicitly or implicitly indicate to the UE which of the TCI states is applicable for no-LBT operation without restriction in terms of channel occupancy duration and/or no-LBT operation with restriction in terms of channel occupancy duration or for other cases.

In one implementation, two sets of TCI states (tables) are activated by medium access control ("MAC") control element ("CE"), wherein one set is associated with no-LBT based channel access mechanism in unlicensed bands and the other set is associated with other channel access mechanisms including licensed access as well. Activation of one of the sets of TCI states can be used to implicitly indicate to the UE whether to apply no-LBT or LBT mode. Alternatively, if the network explicitly indicates/configures the UE to apply no-LBT mode, then the UE can assume which of the sets of TCI states to consider for TCI state indication.

In another implementation, only one set of TCI states are activated by MAC CE, wherein at least one of the TCI states is associated with no-LBT based channel access mechanism. For no-LBT mechanism, the UE is expected to be indicated with the TCI state associated with no-LBT mechanism. Alternatively, the UE is expected to switch the channel access mechanism between no-LBT mode and LBT mode depending up on which TCI state is indicated.

In another implementation, only one set of TCI states are activated by MAC CE, wherein at least one of the TCI indices is associated with two TCI states. In one embodiment, one TCI state is associated with no-LBT based channel access mechanism, while the other TCI state is associated with all other channel access mechanisms.

In one example, a single TCI state table contains configuration to support both no-LBT and LBT and gNB could implicitly signal the switch from LBT to no-LBT and vice versa using the TCI state signaled in the DCI. It is noted that a TCI state could be applied for both cases as well e.g., no-LBT and LBT channel access mechanism.

In a third embodiment directed to UE procedures for switching from no-LBT to LBT mode at a UE, according to one embodiment the UE provides assistance information to the network to indicate if it is able to achieve at least a combined maximum gain from antenna configuration and beamforming above a certain threshold for its UL transmission. Alternatively, UE indicates whether it can support no-LBT mechanism for unlicensed channel access without any restriction in terms of duration for which the channel can be occupied.

In one implementation, such an indication, as described above, is introduced as a part of UE capability information/ UE assistance information ("UAI"). If the UE indicates its capability to support no-LBT mode, then the UE can be expected to be configured with either no-LBT mode and/or LBT mode by semi-static and/or dynamic configuration by the network. If the UE indicates its capability to not support no-LBT mode, then the UE is not expected to be configured with no-LBT mode by the network, and not expected to be configured to signal no-LBT corresponding beams in UCI. Conversely, in one embodiment, such a UE should ignore a configuration putting it into no-LBT mode.

In some embodiments, the UE is configured with two thresholds in terms of combined maximum antenna configuration gain and beamforming gain for its UL transmission, wherein one threshold is used by the UE to report its capability for supporting no-LBT operation (without restriction in terms of duration for channel occupancy) as an initiating device and a second threshold is used by the UE to report its capability for supporting no-LBT operation as a responding device.

In some embodiments, instead of indicating the support or no support of no-LBT as part of UE capability (or in addition to UE capability), it can be dynamically indicated by the UE depending on the beams (QCL type-D assumption) configured/indicated by the network.

In one implementation, the UE receives a dynamic UL grant (scheduling DCI in PDCCH) by the network or CG configuration/activation for UL transmission in unlicensed band and is also indicated/configured with a TCI state indicating at least one QCL type-D assumption. In another implementation, CG UL resource can be activated specifically for LBT and no-LBT implicitly using the relevant TCI state (assuming separate TCI state for LBT and No-LBT). The same CG-UL resource can be re-activated for No-LBT or LBT by sending another activation DCI using relevant TCI state information. In another implementation, activation DCI contains explicit field indicating No-LBT and LBT.

In an alternative implementation, for a dynamic UL grant (scheduling DCI in PDCCH) by the network or CG configuration/activation for UL transmission in unlicensed band, the UE overrides the configured TCI state signaled in UL DCI or CG configuration/activation for the next UL transmission and autonomously uses a TCI (beam) that corresponds to the already indicated beam for no-LBT.

Furthermore, in one embodiment, if the UE is configured/ indicated by the network to operate in no-LBT mode, then to determine which channel access mechanism to apply, the following procedure is implemented at the UE:

1. The UE checks if the combined maximum gain of antenna configuration for its UL transmission on the indicated beam is above a threshold to operate in no-LBT mode without any restriction in terms of channel occupancy duration (or basically if it satisfies the requirement to operate in no-LBT mode as initiating device);

2. If the UE satisfies the criteria in step 1, then the UE performs UL transmission as scheduled by the network using no-LBT mode and without channel occupancy limitation. However, if the criteria in step 1 is not satisfied, then the UE goes to step 3;

3. The UE checks if the combined maximum gain of antenna configuration for its UL transmission on the indicated beam is above a threshold to operate in no-LBT mode with restriction in terms of channel occupancy duration (e.g., when operating as a responding device) and also if the duration of UL transmission burst is less than or equal to the channel occupancy duration requirement, then the UE performs UL transmission as scheduled by the network using no-LBT mode, otherwise the UE proceeds to either step 4 or step 5;

4. The UE checks if the combined maximum gain of antenna configuration for its UL transmission on the indicated beam is above a threshold to operate in no-LBT mode with restriction in terms of channel occupancy duration (e.g., when operating as responding device) and if the duration of UL transmission burst is greater than the channel occupancy duration requirement, then the UE used no-LBT up to the maximum allowed duration and switches to LBT-mode for any later scheduled/configured transmissions;

5. The UE checks if the combined maximum gain of antenna configuration for its UL transmission on the indicated beam is above a threshold to operate in no-LBT mode with restriction in terms of channel occupancy duration (e.g., when operating as responding device) and if the duration of UL transmission burst is greater than the channel occupancy duration requirement (based on knowledge at the time of checking), then the UE applies LBT mode immediately.

In the aforementioned procedures and checks, the channel occupancy duration requirement may represent a maximum channel occupancy time ("MCOT") duration, a restriction/limitation on the allowed duration of a channel occupancy, for example, as specified in 3GPP TS 37.213 v17.0.0.

In an alternate implementation, the UE receives a dynamic UL grant (scheduling DCI in PDCCH) by the network or CG configuration/activation for UL transmission in unlicensed band and is also indicated/configured with a TCI state indicating at least one QCL type-D assumption. Furthermore, if the UE is configured/indicated by the network to operate in no-LBT mode, then to determine which channel access mechanism to apply, in one embodiment, the following procedure is implemented at the UE:

1. The UE checks if the combined maximum gain of antenna configuration of its UL transmission and the indicated beam is above a threshold to operate in no-LBT mode without any restriction in terms of channel occupancy duration (or basically if it satisfies the requirement to operate in no-LBT mode as initiating device);

2. If the UE satisfies the criteria in step 1, then the UE performs UL transmission as scheduled by the network using no-LBT mode and independent on the duration of the channel occupancy. However, if the criteria in step 1 is not satisfied, then the UE goes to step 3;

3. The UE performs UL transmission as scheduled by network using LBT mode where UE performs clear channel assessment ("CCA") according to the specified channel access requirements.

In a fourth embodiment directed to mixed mode operation between no-LBT and LBT at initiating and responding device, mixed mode channel access can be supported wherein the initiating device may operate with no-LBT mode and the responding device may operate with LBT mode or vice-versa.

In one implementation, the initiating device is a gNB operating in no-LBT mode and scheduled UL transmission for a UE e.g., responding device, but the UE responds using LBT mode if it is not able to satisfy the requirement for no-LBT channel access mechanism. For LBT mode at the UE, it will initiate a COT as gNB operated in no-LBT mode. Therefore, in an implementation, a UE receives an indication from a gNB that the gNB is operating in no-LBT mode. This indication may be specified per the gNB's transmitted beam.

In some embodiments, the beam-specific channel access mechanism can be configured for the initiating and responding device. For example, when multiple transmissions are scheduled for UL at the UE on multiple beams, then some transmissions can apply no-LBT mode if the requirement to operate in no-LBT mode is satisfied, while the other transmissions need to perform LBT. In one implementation, the UE either can use a gNB initiated COT for transmissions with LBT mode or can initiate a COT, if needed.

Some examples are provided in the following:

a. The UE indicates whether a UL transmission is associated with no-LBT mode or with LBT mode (e.g., as part of a PUSCH transmission such as in a CG-UCI for configured UL transmission). The indication could help the gNB in scheduling (future) UL transmissions. In certain embodiments, the indication may be useful also for decoding the current UL transmission if the indication is decoded first.

b. The UE indicates e.g., at the beginning of a fixed frame period ("FFP") (e.g., in CG-UCI), whether the FFP corresponds to a no-LBT based operation or LBT-based operation. In one embodiment, a UE is not expected to have two UL transmissions in an FFP, wherein one UL transmission is based on no-LBT operation, and the other UL transmission is based on LBT operation. The indication may help with UL scheduling as the gNB knows in advance whether an LBT gap is needed or not.

c. The UE may be configured with more than one FFP configuration for UE-initiated COT operation—one configuration for UL transmissions based on no-LBT mode, and one configuration for UL transmissions based on LBT mode. In an example, FFP duration/periodicity of no-LBT mode can be a multiple or a factor of FFP duration/periodicity of LBT mode.

d. The UE may/can transmit within an idle period of an FFP in which the UE-initiated a COT if the UE indicates the FFP (or the next FFP) is associated with no-LBT based operation.

e. The UE can indicate in CG-UCI if a UE-initiated COT can be shared with a gNB and/or when the gNB can share the UE-initiated COT. If the gNB shares a UE-initiated COT corresponding to no-LBT mode, the gNB may/does not need to respect the idle period associated with the FFP in which the UE initiated the COT (e.g., the gNB can transmit within the idle period), e.g., the gNB transmissions with a set of transmission directions are allowed within the idle period. In an example, the set of transmission directions is determined based on UE beam directions wherein no-LBT mode is allowed. The association of gNB transmission directions and the UE beam directions is derived based on RRC, MAC-CE, DCI signaling, and/or the like.

f. The network may configure a first set of time durations (e.g., in periodic manner) wherein only LBT mode is allowed and a second set of time durations (e.g., in periodic manner) where only no-LBT mode is allowed.

Figure 2:
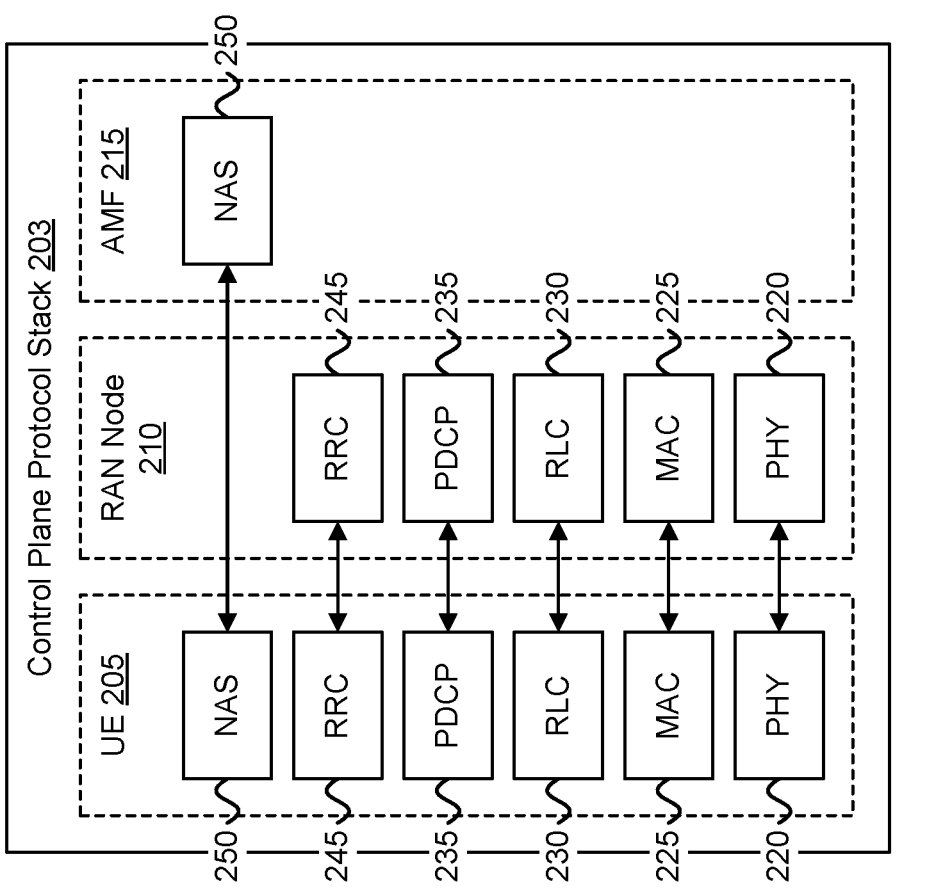
FIG. 2 is a diagram illustrating one embodiment of a NR protocol stack.
Figure 2:
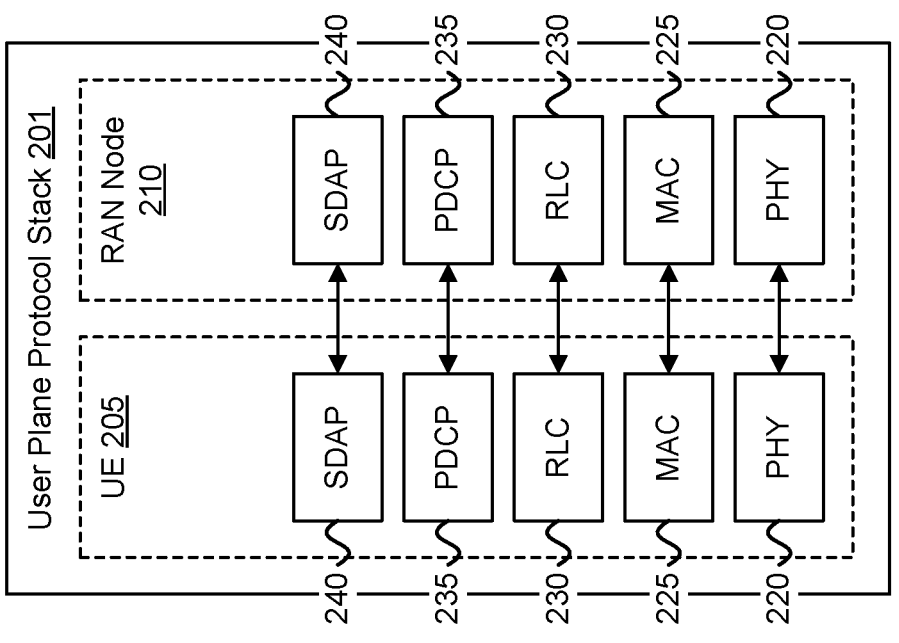

FIG. 2 depicts a NR protocol stack 200, according to embodiments of the disclosure. While FIG. 2 shows the UE 205, the RAN node 210 and an AMF 215 in a 5G core network ("5GC"), these are representative of a set of remote units 105 interacting with a base unit 121 and a mobile core network 140. As depicted, the protocol stack 200 comprises a User Plane protocol stack 201 and a Control Plane protocol stack 203. The User Plane protocol stack 201 includes a physical ("PHY") layer 220, a MAC sublayer 225, the Radio Link Control ("RLC") sublayer 230, a Packet Data Convergence Protocol ("PDCP") sublayer 235, and a Service Data Adaptation Protocol ("SDAP") sublayer 240. The Control Plane protocol stack 203 includes a physical layer 220, a MAC sublayer 225, a RLC sublayer 230, and a PDCP sublayer 235. The Control Plane protocol stack 203 also includes an RRC sublayer 245 and a Non-Access Stratum ("NAS") sublayer 250.

The AS layer (also referred to as "AS protocol stack") for the User Plane protocol stack 201 consists of at least SDAP, PDCP, RLC and MAC sublayers, and the physical layer. The AS layer for the Control Plane protocol stack 203 consists of at least RRC, PDCP, RLC and MAC sublayers, and the physical layer. The Layer-2 ("L2") is split into the SDAP, PDCP, RLC and MAC sublayers. The Layer-3 ("L3") includes the RRC sublayer 245 and the NAS layer 250 for the control plane and includes, e.g., an Internet Protocol ("IP") layer and/or PDU Layer (not depicted) for the user plane. L1 and L2 are referred to as "lower layers," while L3 and above (e.g., transport layer, application layer) are referred to as "higher layers" or "upper layers."

The physical layer 220 offers transport channels to the MAC sublayer 225. The physical layer 220 may perform a CCA/LBT procedure using energy detection thresholds, as described herein. In certain embodiments, the physical layer 220 may send a notification of UL LBT failure to a MAC entity at the MAC sublayer 225. The MAC sublayer 225 offers logical channels to the RLC sublayer 230. The RLC sublayer 230 offers RLC channels to the PDCP sublayer 235. The PDCP sublayer 235 offers radio bearers to the SDAP sublayer 240 and/or RRC layer 245. The SDAP sublayer 240 offers QoS flows to the core network (e.g., 5GC). The RRC layer 245 provides for the addition, modification, and release of Carrier Aggregation and/or Dual Connectivity. The RRC layer 245 also manages the establishment, configuration, maintenance, and release of Signaling Radio Bearers ("SRBs") and Data Radio Bearers ("DRBs").

The NAS layer 250 is between the UE 205 and the 5GC 215. NAS messages are passed transparently through the RAN. The NAS layer 250 is used to manage the establishment of communication sessions and for maintaining continuous communications with the UE 205 as it moves between different cells of the RAN. In contrast, the AS layer is between the UE 205 and the RAN (e.g., RAN node 210) and carries information over the wireless portion of the network.

Figure 3:
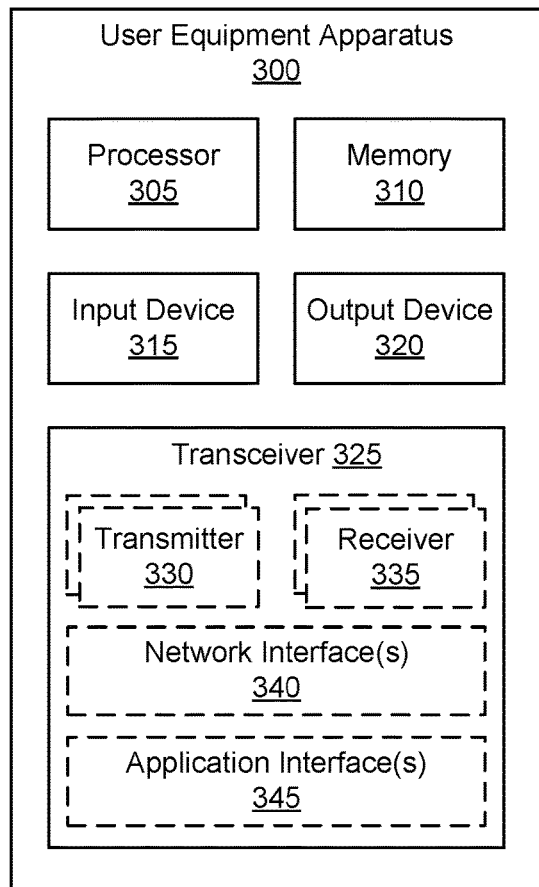
FIG. 3 is a block diagram illustrating one embodiment of a user equipment apparatus that may be used for UE assistance for no-LBT based unlicensed channel access.

FIG. 3 depicts a user equipment apparatus 300 that may be used for UE assistance for no-LBT based unlicensed channel access, according to embodiments of the disclosure. In various embodiments, the user equipment apparatus 300 is used to implement one or more of the solutions described above. The user equipment apparatus 300 may be one embodiment of a UE, such as the remote unit 105 and/or the UE 205, as described above. Furthermore, the user equipment apparatus 300 may include a processor 305, a memory 310, an input device 315, an output device 320, and a transceiver 325. In some embodiments, the input device 315 and the output device 320 are combined into a single device, such as a touchscreen. In certain embodiments, the user equipment apparatus 300 may not include any input device 315 and/or output device 320. In various embodiments, the user equipment apparatus 300 may include one or more of:

the processor 305, the memory 310, and the transceiver 325, and may not include the input device 315 and/or the output device 320.

As depicted, the transceiver 325 includes at least one transmitter 330 and at least one receiver 335. Here, the transceiver 325 communicates with one or more base units 121. Additionally, the transceiver 325 may support at least one network interface 340 and/or application interface 345. The application interface(s) 345 may support one or more APIs. The network interface(s) 340 may support 3GPP reference points, such as Uu and PC5. Other network interfaces 340 may be supported, as understood by one of ordinary skill in the art.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325. In certain embodiments, the processor 305 may include an application processor (also known as "main processor") which manages application-domain and operating system ("OS") functions and a baseband processor (also known as "baseband radio processor") which manages radio functions.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM/f"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data related to CSI enhancements for higher frequencies. For example, the memory 310 may store parameters, configurations, resource assignments, policies, and the like as described above. In certain embodiments, the memory 310 also stores program code and related data, such as an operating system or other controller algorithms operating on the user equipment apparatus 300, and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, is designed to output visual, audible, and/or haptic signals. In some embodiments, the output device 320 includes an electronically controllable display or display device capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display separate from, but communicatively coupled to, the rest of the user equipment apparatus 300, such as a smart watch, smart glasses, a heads-up display, or the like. Further, the output device 320 may be a component of a smart phone, a personal digital assistant, a television, a table computer, a notebook (laptop) computer, a personal computer, a vehicle dash-board, or the like.

In certain embodiments, the output device 320 includes one or more speakers for producing sound. For example, the output device 320 may produce an audible alert or notifi-cation (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 includes at least transmitter 330 and at least one receiver 335. The transceiver 325 may be used to provide UL communication signals to a base unit 121 and to receive DL communication signals from the base unit 121, as described herein. Similarly, the transceiver 325 may be used to transmit and receive SL signals (e.g., V2X commu-nication), as described herein. Although only one transmitter 330 and one receiver 335 are illustrated, the user equipment apparatus 300 may have any suitable number of transmitters 330 and receivers 335. Further, the transmitter(s) 330 and the receiver(s) 335 may be any suitable type of transmitters and receivers. In one embodiment, the transceiver 325 includes a first transmitter/receiver pair used to communi-cate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile commu-nication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 325, transmitters 330, and receivers 335 may be implemented as physically separate components that access a shared hardware resource and/or software resource, such as for example, the network inter-face 340.

In various embodiments, one or more transmitters 330 and/or one or more receivers 335 may be implemented and/or integrated into a single hardware component, such as a multi-transceiver chip, a system-on-a-chip, an ASIC, or other type of hardware component. In certain embodiments, one or more transmitters 330 and/or one or more receivers 335 may be implemented and/or integrated into a multi-chip module. In some embodiments, other components such as the network interface 340 or other hardware components/circuits may be integrated with any number of transmitters 330 and/or receivers 335 into a single chip. In such embodi-ment, the transmitters 330 and receivers 335 may be logi-cally configured as a transceiver 325 that uses one more common control signals or as modular transmitters 330 and receivers 335 implemented in the same hardware chip or in a multi-chip module.

In one embodiment, the processor 305 calculates a com-bined gain from a combination of an antenna configuration gain and a beamforming gain for at least one transmission beam. In one embodiment, the processor 305 determines if the at least one transmission beam can be used for a no-LBT based channel access mechanism in an unlicensed band with or without a channel occupancy duration restriction based on the combined gain. In one embodiment, the processor 305 transmits, via the transceiver 325, to a network node, infor-mation that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node can apply an LBT-based channel access mechanism, or some combination thereof.

In one embodiment, the UE apparatus is configured by the network node with beam-specific RS resources for perform-ing antenna measurements, generating a corresponding mea-surement report, and transmitting the corresponding mea-surement report to the network node.

In one embodiment, the measurement report comprises at least an indication of whether the at least one transmission beam associated with the beam-specific RS resources can be used by the apparatus for no-LBT based channel access mechanism without channel occupancy duration restriction, no-LBT based channel access mechanism with channel occupancy duration restriction, an LBT-based channel access mechanism, or some combination thereof.

In one embodiment, the UE apparatus is configured by the network node to report measurements for the beam-specific RS resources in response to determining that the at least one transmission beam can be used by the apparatus for no-LBT based channel access with or without channel occupancy duration restriction.

In one embodiment, in response to transmitting the infor-mation to the network node, the apparatus is configured with at least one transmission beam for no-LBT based channel access with or without channel occupancy duration restric-tion.

In one embodiment, the processor 305 configures the UE apparatus to activate with at least two sets of TCI states, wherein a first set of TCI states corresponds to no-LBT based channel access mechanism and a second set of TCI states corresponds to LBT based channel access mechanism or licensed channel access mechanism.

In one embodiment, the UE apparatus is configured with at least two sets of TCI states, and wherein the processor is configured to cause the apparatus to activate with one set of the at least two sets of TCI states based on whether the no-LBT based channel access mechanism or the LBT based channel access mechanism is indicated.

In one embodiment, the processor 305 configures the UE apparatus to activate with one set of the at least two sets of TCI states, the one set corresponding to the no-LBT based channel access mechanism.

In one embodiment, the processor 305 configures the UE apparatus to activate with one set of the at least two sets of TCI states, wherein at least one TCI index indicates two TCI states such that a first TCI state corresponds to the no-LBT based channel access mechanism and a second TCI state corresponds to the LBT based channel access mechanism or licensed channel access mechanism.

In one embodiment, the UE apparatus is implicitly indicated with the no-LBT based channel access mechanism or the LBT based channel access mechanism depending on the indicated at least two sets of TCI states.

Figure 4:
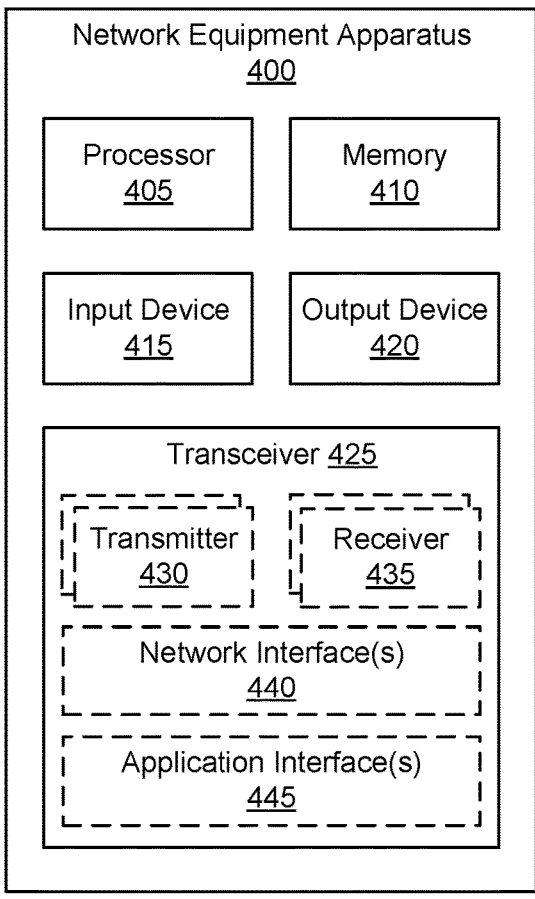
FIG. 4 is a block diagram illustrating one embodiment of a network apparatus that may be used for UE assistance for no-LBT based unlicensed channel access.

FIG. 4 depicts one embodiment of a network apparatus 400 that may be used for UE assistance for no-LBT based unlicensed channel access, according to embodiments of the disclosure. In some embodiments, the network apparatus 400 may be one embodiment of a RAN node and its supporting hardware, such as the base unit 121 and/or gNB, described above. Furthermore, network apparatus 400 may include a processor 405, a memory 410, an input device 415, an output device 420, and a transceiver 425. In certain embodiments, the network apparatus 400 does not include any input device 415 and/or output device 420.

As depicted, the transceiver 425 includes at least one transmitter 430 and at least one receiver 435. Here, the transceiver 425 communicates with one or more remote units 105. Additionally, the transceiver 425 may support at least one network interface 440 and/or application interface 445. The application interface(s) 445 may support one or more APIs. The network interface(s) 440 may support 3GPP reference points, such as Uu, N1, N2, N3, N5, N6 and/or N7 interfaces. Other network interfaces 440 may be supported, as understood by one of ordinary skill in the art.

When implementing an NEF, the network interface(s) 440 may include an interface for communicating with an application function (i.e., N5) and with at least one network function (e.g., UDR, SFC function, UPF) in a mobile communication network, such as the mobile core network 130.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425. In certain embodiments, the processor 405 may include an application processor (also known as "main processor") which manages application-domain and operating system ("OS") functions and a baseband processor (also known as "baseband radio processor") which manages radio function. In various embodiments, the processor 405 controls the network apparatus 400 to implement the above described network entity behaviors (e.g., of the gNB) for UE assistance for no-LBT based unlicensed channel access.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to CSI enhancements for higher frequencies. For example, the memory 410 may store parameters, configurations, resource assignments, policies, and the like as described above. In certain embodiments, the memory 410 also stores program code and related data, such as an operating system ("OS") or other controller algorithms operating on the network apparatus 400, and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

As discussed above, the transceiver 425 may communicate with one or more remote units and/or with one or more interworking functions that provide access to one or more PLMNs. The transceiver 425 may also communicate with one or more network functions (e.g., in the mobile core network 80). The transceiver 425 operates under the control of the processor 405 to transmit messages, data, and other signals and also to receive messages, data, and other signals. For example, the processor 405 may selectively activate the transceiver (or portions thereof) at particular times in order to send and receive messages.

The transceiver 425 may include one or more transmitters 430 and one or more receivers 435. In certain embodiments, the one or more transmitters 430 and/or the one or more receivers 435 may share transceiver hardware and/or circuitry. For example, the one or more transmitters 430 and/or the one or more receivers 435 may share antenna(s), antenna tuner(s), amplifier(s), filter(s), oscillator(s), mixer(s), modulator/demodulator(s), power supply, and the like. In one embodiment, the transceiver 425 implements multiple logical transceivers using different communication protocols or protocol stacks, while using common physical hardware.

In one embodiment, the processor 405 is configured to transmit, via the transceiver 425, a configuration to a UE apparatus for measuring DL RSs on configured RS resources and indicating one or more transmission beams that support a no-LBT based channel access mechanism with or without channel occupancy duration restriction based on the measured DL RSs. In one embodiment, the processor 405 is configured to receive, via the transceiver 425, from the UE apparatus, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node is to apply an LBT-based channel access mechanism, or some combination thereof.

FIG. 5 is a flowchart diagram of a method 500 for UE assistance for no-LBT based unlicensed channel access. The method 500 may be performed by a UE as described herein, for example, the remote unit 105 and/or the user equipment apparatus 300. In some embodiments, the method 500 may be performed by a processor executing program code, for example, a microcontroller, a microprocessor, a CPU, a GPU, an auxiliary processing unit, a FPGA, or the like.

In one embodiment, the method 500 begins and calculates 505 a combined gain from a combination of an antenna configuration gain and a beamforming gain for at least one transmission beam. In one embodiment, the method 500 determines 510 if the at least one transmission beam can be used for a no-listen-before-talk ("LBT") based channel access mechanism in an unlicensed band with or without a channel occupancy duration restriction based on the combined gain. In one embodiment, the method 500 transmits 515, to a network node, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node can apply an LBT-based channel access mechanism, or some combination thereof, and method 500 ends.

FIG. 6 is a flowchart diagram of a method 600 for UE assistance for no-LBT based unlicensed channel access. The method 600 may be performed by a network node as described herein, for example, a gNB, a base unit 121, and/or a network equipment apparatus 400. In some embodiments, the method 600 may be performed by a processor executing program code, for example, a microcontroller, a microprocessor, a CPU, a GPU, an auxiliary processing unit, a FPGA, or the like.

In one embodiment, the method 600 begins and transmits 605 a configuration to a user equipment ("UE") apparatus for measuring downlink ("DL") reference signals ("RSs") on configured RS resources and indicating one or more transmission beams that support a no-LBT based channel access mechanism with or without channel occupancy duration restriction based on the measured DL RSs. In one embodiment, the method 600 receives 610, from the UE apparatus, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node is to apply an LBT-based channel access mechanism, or some combination thereof, and the method 600 ends.

A first apparatus is disclosed for UE assistance for no-LBT based unlicensed channel access. The first apparatus may include a UE as described herein, for example, the remote unit 105 and/or the user equipment apparatus 300. In some embodiments, the first apparatus includes a processor executing program code, for example, a microcontroller, a microprocessor, a CPU, a GPU, an auxiliary processing unit, a FPGA, or the like.

In one embodiment, the first apparatus includes a transceiver and a processor coupled to the transceiver. In one embodiment, the processor is configured to cause the apparatus to calculate a combined gain from a combination of an antenna configuration gain and a beamforming gain for at least one transmission beam. In one embodiment, the processor is configured to cause the apparatus to determine if the at least one transmission beam can be used for a no-LBT based channel access mechanism in an unlicensed band with or without a channel occupancy duration restriction based on the combined gain. In one embodiment, the processor is configured to cause the apparatus to transmit, to a network node, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node can apply an LBT-based channel access mechanism, or some combination thereof.

In one embodiment, the apparatus is configured by the network node with beam-specific RS resources for performing antenna measurements, generating a corresponding measurement report, and transmitting the corresponding measurement report to the network node.

In one embodiment, the measurement report comprises at least an indication of whether the at least one transmission beam associated with the beam-specific RS resources can be used by the apparatus for no-LBT based channel access mechanism without channel occupancy duration restriction, no-LBT based channel access mechanism with channel occupancy duration restriction, an LBT-based channel access mechanism, or some combination thereof.

In one embodiment, the apparatus is configured by the network node to report measurements for the beam-specific RS resources in response to determining that the at least one transmission beam can be used by the apparatus for no-LBT based channel access with or without channel occupancy duration restriction.

In one embodiment, in response to transmitting the information to the network node, the apparatus is configured with at least one transmission beam for no-LBT based channel access with or without channel occupancy duration restriction.

In one embodiment, the processor is configured to cause the apparatus to activate with at least two sets of TCI states, wherein a first set of TCI states corresponds to no-LBT based channel access mechanism and a second set of TCI states corresponds to LBT based channel access mechanism or licensed channel access mechanism.

In one embodiment, the apparatus is configured with at least two sets of TCI states, and wherein the processor is configured to cause the apparatus to activate with one set of the at least two sets of TCI states based on whether the no-LBT based channel access mechanism or the LBT based channel access mechanism is indicated.

In one embodiment, the processor is configured to cause the apparatus to activate with one set of the at least two sets of TCI states, the one set corresponding to the no-LBT based channel access mechanism.

In one embodiment, the processor is configured to cause the apparatus to activate with one set of the at least two sets of TCI states, wherein at least one TCI index indicates two TCI states such that a first TCI state corresponds to the no-LBT based channel access mechanism and a second TCI state corresponds to the LBT based channel access mechanism or licensed channel access mechanism.

In one embodiment, the apparatus is implicitly indicated with the no-LBT based channel access mechanism or the LBT based channel access mechanism depending on the indicated at least two sets of TCI states.

A first method is disclosed for UE assistance for no-LBT based unlicensed channel access. The first method may be performed by a UE apparatus as described herein, for example, the remote unit 105 and/or the user equipment apparatus 300. In some embodiments, the first method may be performed by a processor executing program code, for example, a microcontroller, a microprocessor, a CPU, a GPU, an auxiliary processing unit, a FPGA, or the like.

In one embodiment, the first method for a UE apparatus calculates a combined gain from a combination of an antenna configuration gain and a beamforming gain for at least one transmission beam. In one embodiment, the first method determines if the at least one transmission beam can be used for a no-LBT based channel access mechanism in an unlicensed band with or without a channel occupancy duration restriction based on the combined gain. In one embodiment, the first method transmits, to a network node, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node can apply an LBT-based channel access mechanism, or some combination thereof.

In one embodiment, the apparatus is configured by the network node with beam-specific RS resources for performing antenna measurements, generating a corresponding measurement report, and transmitting the corresponding measurement report to the network node.

In one embodiment, the measurement report comprises at least an indication of whether the at least one transmission beam associated with the beam-specific RS resources can be used by the apparatus for no-LBT based channel access mechanism without channel occupancy duration restriction, no-LBT based channel access mechanism with channel occupancy duration restriction, an LBT-based channel access mechanism, or some combination thereof.

In one embodiment, the apparatus is configured by the network node to report measurements for the beam-specific RS resources in response to determining that the at least one transmission beam can be used by the apparatus for no-LBT based channel access with or without channel occupancy duration restriction.

In one embodiment, the first method, in response to transmitting the information to the network node, configures the apparatus with at least one transmission beam for no-LBT based channel access with or without channel occupancy duration restriction.

In one embodiment, the first method activates the apparatus with at least two sets of TCI states, wherein a first set of TCI states corresponds to no-LBT based channel access mechanism and a second set of TCI states corresponds to LBT based channel access mechanism or licensed channel access mechanism.

In one embodiment, the apparatus is configured with at least two sets of TCI states, and wherein the processor is configured to cause the apparatus to activate with one set of the at least two sets of TCI states based on whether the no-LBT based channel access mechanism or the LBT based channel access mechanism is indicated.

In one embodiment, the first method activates the apparatus with one set of the at least two sets of TCI states, the one set corresponding to the no-LBT based channel access mechanism.

In one embodiment, the first method activates the apparatus with one set of the at least two sets of TCI states, wherein at least one TCI index indicates two TCI states such that a first TCI state corresponds to the no-LBT based channel access mechanism and a second TCI state corresponds to the LBT based channel access mechanism or licensed channel access mechanism.

In one embodiment, the apparatus is implicitly indicated with the no-LBT based channel access mechanism or the LBT based channel access mechanism depending on the indicated at least two sets of TCI states.

A second apparatus is disclosed for UE assistance for no-LBT based unlicensed channel access. The second apparatus may include a network node as described herein, for example, a gNB, a base unit 121, and/or a network equipment apparatus 400. In some embodiments, second apparatus includes a processor executing program code, for example, a microcontroller, a microprocessor, a CPU, a GPU, an auxiliary processing unit, a FPGA, or the like.

In one embodiment, the second apparatus includes a transceiver and a processor coupled to the transceiver. In one embodiment, the processor is configured to cause the apparatus to transmit a configuration to a UE apparatus for measuring DL RSs on configured RS resources and indicating one or more transmission beams that support a no-LBT based channel access mechanism with or without channel occupancy duration restriction based on the measured DL RSs. In one embodiment, the processor is configured to cause the apparatus to receive, from the UE apparatus, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node is to apply an LBT-based channel access mechanism, or some combination thereof.

A second method is disclosed for UE assistance for no-LBT based unlicensed channel access. The second method may be performed by a network node as described herein, for example, a gNB, a base unit 121, and/or a network equipment apparatus 400. In some embodiments, the second method may be performed by a processor executing program code, for example, a microcontroller, a microprocessor, a CPU, a GPU, an auxiliary processing unit, a FPGA, or the like.

In one embodiment, the second method transmits a configuration to a UE apparatus for measuring DL RSs on configured RS resources and indicating one or more transmission beams that support a no-LBT based channel access mechanism with or without channel occupancy duration restriction based on the measured DL RSs. In one embodiment, the second method receives, from the UE apparatus, information that indicates, for the at least one transmission beam, whether the at least one transmission beam can be used for a no-LBT based channel access mechanism in an unlicensed band with a channel occupancy duration restriction, whether the at least one transmission beam can be used for a no-LBT based channel access mechanism in an unlicensed band without a channel occupancy duration restriction, whether the network node is to apply an LBT-based channel access mechanism, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE"), comprising:
at least one memory; and
at least one processor coupled with the at least one memory and configured to cause the UE to:
calculate a combined gain from a combination of an antenna configuration gain and a beamforming gain for at least one transmission beam;
determine if the at least one transmission beam can be used for a no-listen-before-talk ("LBT") based channel access mechanism in an unlicensed band with or without a channel occupancy duration restriction based on the combined gain; and
transmit, to a network node, information that indicates, for the at least one transmission beam, whether the at least one transmission beam can be used for the no-LBT based channel access mechanism in the unlicensed band with the channel occupancy duration restriction, whether the at least one transmission beam can be used for the no-LBT based channel access mechanism in the unlicensed band without the channel occupancy duration restriction, whether the network node can apply an LBT-based channel access mechanism, or some combination thereof.

2. The UE of claim 1, wherein the UE is configured by the network node with beam-specific reference signal ("RS") resources for performing antenna measurements, generating a corresponding measurement report, and transmitting the corresponding measurement report to the network node.

3. The UE of claim 2, wherein the measurement report comprises at least an indication of whether the at least one transmission beam associated with the beam-specific RS resources can be used by the UE for the no-LBT based channel access mechanism without the channel occupancy duration restriction, the no-LBT based channel access mechanism with the channel occupancy duration restriction, the LBT-based channel access mechanism, or some combination thereof.

4. The UE of claim 2, wherein the UE is configured by the network node to report measurements for the beam-specific RS resources in response to determining that the at least one transmission beam can be used by the UE for no-LBT based channel access with or without the channel occupancy duration restriction.

5. The UE of claim 1, in response to transmitting the information to the network node, the UE is configured with at least one transmission beam for no-LBT based channel access with or without the channel occupancy duration restriction.

6. The UE of claim 5, wherein the at least one processor is configured to cause the UE to activate with at least two sets of transmission configuration indication ("TCI") states, wherein a first set of TCI states corresponds to no-LBT based channel access mechanism and a second set of TCI states corresponds to LBT based channel access mechanism or licensed channel access mechanism.

7. The UE of claim 6, wherein the UE is configured with at least two sets of TCI states, and wherein the processor is configured to cause the UE to activate with one set of the at least two sets of TCI states based on whether the no-LBT based channel access mechanism or the LBT based channel access mechanism is indicated.

8. The UE of claim 6, wherein the at least one processor is configured to cause the UE to activate with one set of the at least two sets of TCI states, the one set corresponding to the no-LBT based channel access mechanism.

9. The UE of claim 6, wherein the at least one processor is configured to cause the UE to activate with one set of the at least two sets of TCI states, wherein at least one TCI index indicates two TCI states such that a first TCI state corresponds to the no-LBT based channel access mechanism and a second TCI state corresponds to the LBT based channel access mechanism or licensed channel access mechanism.

10. The UE of claim 6, wherein the UE is implicitly indicated with the no-LBT based channel access mechanism or the LBT based channel access mechanism depending on the at least two sets of TCI states.

11. A method of a user equipment ("UE"), comprising:
calculating a combined gain from a combination of an antenna configuration gain and a beamforming gain for at least one transmission beam;
determining if the at least one transmission beam can be used for a no-listen-before-talk ("LBT") based channel access mechanism in an unlicensed band with or without a channel occupancy duration restriction based on the combined gain; and
transmitting, to a network node, information that indicates, for the at least one transmission beam, whether the at least one transmission beam can be used for the no-LBT based channel access mechanism in the unlicensed band with the channel occupancy duration restriction, whether the at least one transmission beam can be used for the no-LBT based channel access mechanism in the unlicensed band without the channel occupancy duration restriction, whether the network node can apply an LBT-based channel access mechanism, or some combination thereof.

12. The method of claim 11, further comprising configuring the UE, by the network node, with beam-specific reference signal ("RS") resources for performing antenna measurements, generating a corresponding measurement report, and transmitting the corresponding measurement report to the network node.

13. The method of claim 12, wherein the measurement report comprises at least an indication of whether the at least one transmission beam associated with the beam-specific RS resources can be used by the UE for the no-LBT based channel access mechanism without the channel occupancy duration restriction, the no-LBT based channel access mechanism with the channel occupancy duration restriction, the LBT-based channel access mechanism, or some combination thereof.

14. The method of claim 12, further comprising configuring the UE, by the network node, to report measurements for the beam-specific RS resources in response to determining that the at least one transmission beam can be used by the UE for no-LBT based channel access with or without the channel occupancy duration restriction.

15. A network equipment ("NE"), comprising:

at least one memory; and at least one processor coupled with the at least one memory and configured to cause the NE to:

transmit a configuration to a user equipment ("UE") for measuring downlink ("DL") reference signals ("RSs") on configured RS resources and indicating at least one transmission beam that supports a no-listen-before-talk ("LBT") based channel access mechanism with or without a channel occupancy duration restriction based on the measured DL RSs; and receive, from the UE, information that indicates, for the at least one transmission beam, whether the at least one transmission beam can be used for the no-LBT based channel access mechanism in an unlicensed band with the channel occupancy duration restriction, whether the at least one transmission beam can be used for the no-LBT based channel access mechanism in the unlicensed band without the channel occupancy duration restriction, whether the NE is to apply an LBT-based channel access mechanism, or some combination thereof.

* * * * *